June 29, 1926.   1,590,703
G. SEIBT
OSCILLATORY BODY FOR SOUND REPRODUCTIONS
Filed July 17, 1923
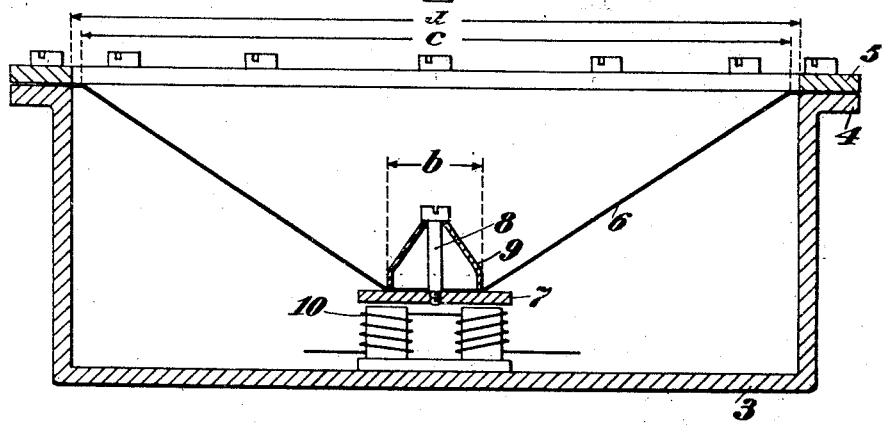
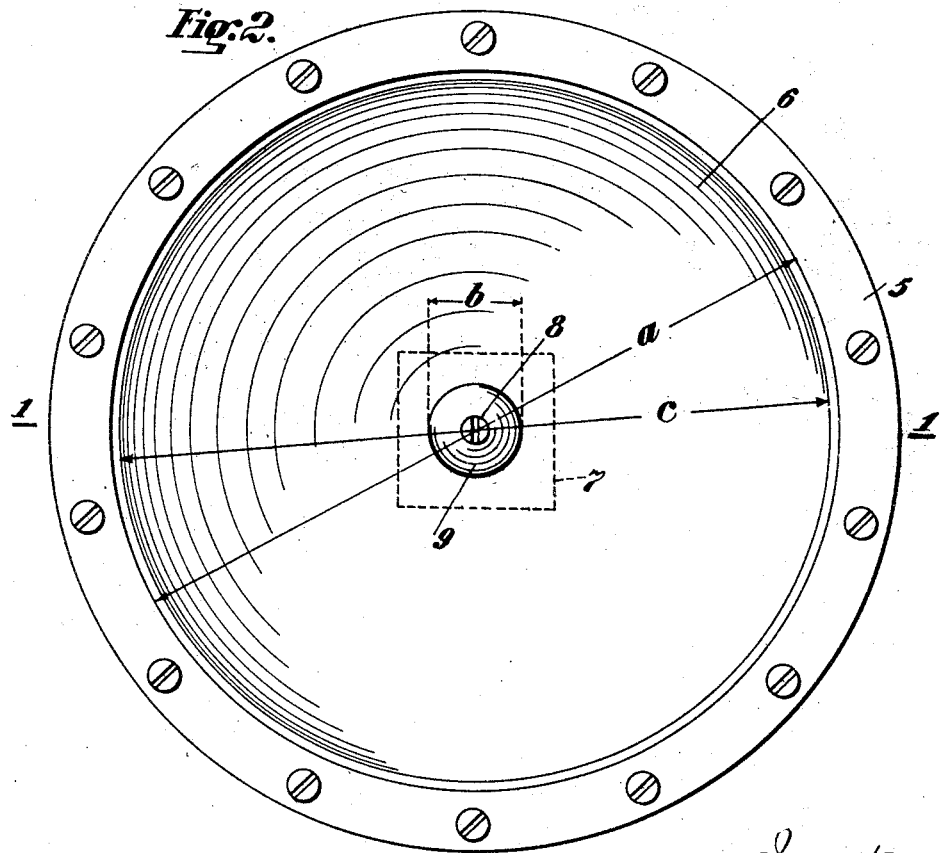
Inventor
Georg Seibt Patented June 29, 1926.

1,590,703

UNITED STATES PATENT OFFICE.

GEORG SEIBT, OF BERLIN-SCHONEBERG, GERMANY.

OSCILLATORY BODY FOR SOUND REPRODUCTIONS.

Application filed July 17, 1923, Serial No. 652,117, and in Germany December 18, 1922.

This invention relates in general to an oscillatory body for the reproduction of musical or articulate sounds, particularly to bodies or diaphragms of this kind for telephone receivers, microphones and sound boxes for the reception or reproduction of sounds in phonographs or the like. The invention relates more particularly to such oscillatory bodies as consist of a light diaphragm and parts fixed to, or mounted on, the same, such as a telephone receiver diaphragm with an iron armature attached thereto. In order to enable these oscillatory bodies to operate with the least possible distortion of the primary oscillations it is necessary first of all to reduce to the greatest possible extent the weight of the diaphragm and the parts attached thereto so as to lower the resistance of the diaphragm to acceleration. The diaphragm must also be arranged so as to have the highest possible natural frequency. Furthermore measures must be adopted by which parts of the surface of the diaphragm are prevented from executing their own vibrations irrespective of other parts of the diaphragm surface, i. e. all surface elements of the diaphragm must always be made to vibrate in phase with each other.

Hitherto the parts attached to such diaphragms were directly riveted or screwed to the diaphragm. This method of fixing the parts is satisfactory as long as the diaphragm has a thickness of a few tenths of a millimeter, but in the case of diaphragms which are considerably thinner and have a thickness of say only 0.05 mms. or less considerable difficulties are encountered. By directly attaching the parts by means of rivets or screws the forces of attachment are concentrated on a very small surface (or surfaces) or part (or parts) and consequently the diaphragms are liable to be deformed at these parts through stretching or bulging during manufacture or when in use. Another drawback of this method of fastening is that the forces to be translated from the diaphragm to the parts fixed thereon (for example the forces exerted by the diaphragm on the style of a phonograph in making a phonographic impression) or the forces to be translated from the attached part to the diaphragm (for example from the armature to a receiver diaphragm), and particularly forces of acceleration, have to be translated by only a few spots on the diaphragm. The great specific stress which is exerted at these few points gives rise to isolated vibrations at the parts of the diaphragm adjacent to the said points and this causes disturbing noises.

The drawbacks are eliminated by the present invention in accordance with which, in an oscillating body consisting of a very thin light diaphragm and an armature or the like attached to the same, the connection between the diaphragm and its attached part is made by means of a thin walled hollow body which is both exceedingly light and stiff and can therefore be caused to apply considerable pressure against the diaphragm and the armature or the like located at the other side of the diaphragm. The hollow stiff body can also be easily arranged so as to press uniformly against a narrow annular surface of the diaphragm and its attached part. Another advantage of this method of fastening is that it enables exceedingly thin diaphragms of, say a thickness of 0.03 or 0.02 mms., to be used without giving rise to the aforesaid drawbacks. Consequently not only the weight of the fastening member but also that of the diaphragm is reduced and therefore the resistance to acceleration is correspondingly decreased. In other words, with given effective forces and counter-forces, that is, with the same accelerating forces and stiffness of the diaphragm, the natural frequency of the oscillatory body is correspondingly increased.

The invention is shown by way of example in the drawing in which an oscillatory body in the form of a receiver diaphragm with an iron armature attached thereto is shown.

Fig. 1 is a section of the upper part of a telephone receiver casing on the line 1—1 of Fig. 2.

Fig. 2 is a plan view.

Referring to the drawing; 3 is the receiver casing to the upper edge 4 of which the receiver diaphragm 6 is clamped by means of a ring 5. The inside diameter of the circular edge 4 or of the ring 5 is denoted $a$.

The diaphragm 6 consists of very thin sheet aluminium of a thickness of say 0.03 mms. To obtain the required stiffness of the diaphragm in spite of its extreme thinness, and to enable all parts of its surface to swing in phase with each other in response to the sound waves, and in order to be able to clamp the diaphragm firmly between flat rings, and to impart to it the necessary elasticity for a high frequency in spite of its stiffness, and finally, to enable a flat iron armature to be fixed to it, the diaphragm is shaped in the form illustrated in the drawing. A hollow cone whose greatest diameter is $c$ joins onto a middle, flat circular part whose diameter is $b$. $c$ is somewhat, say 1 or 2 mms., smaller than $a$. The periphery of the hollow cone joins onto a flat annular rim which is clamped in between the rim 4 of the receiver casing 3 and the ring 5. As the greatest diameter $c$ of the hollow cone is about 1 or 2 mms. smaller than the inside diameter of the ring 5 and the rim 4 a very narrow flat annular strip of a width of about ½ or 1 mm. remains between the inmost clamping line or inner edge of the ring 5 and the bend at which the hollow cone 6 joins onto its flat clamped ring portion. When the hollow cone oscillates as a whole, the narrow strip between the said bend and the said circular inmost clamping line is bent out and in alternately, and on account of the small width of the said strip a high natural rate of vibration of the oscillatory body results.

The flat iron armature 7 which may be made in the form of a square plate, of an area of 12x12 mms. and 0.04 mms. thickness, is fastened in the following manner: The plate 7 has a middle threaded hole into which a small screw 8 may be screwed through a central hole in the diaphragm. Between the head of the small screw 8 and the diaphragm there is a thin-walled hollow body 9, preferably formed in the shape of a hollow cone whose bottom edge is bent down to form a short cylinder with an outside diameter $b$ equal to the diameter of the middle circular surface of the diaphragm. The measurements of the hollow body 9 may be as follows: greatest diameter 9 mms., height 4 mms. and thickness of wall 0.4 mms. By screwing fast the screw 8, pressure is applied uniformly to an annular surface which, in the case assumed, has a diameter of 9 mms. and a thickness of 0.4 mms. The iron armature is caused to oscillate in a known manner by an electromagnet energized by voice currents.

I claim:

1. The combination with a thin conical diaphragm having a non-conical portion; of a member having surface contact with one face of said non-conical portion, an opposed hollow member having marginal contact with the opposite face of said non-conical portion and means passing through said diaphragm and tightly clamping both members to the diaphragm.

2. An oscillating device for reproducing instruments, comprising a thin, truncated cone having a continuous metal wall forming its smaller base, a metal plate on one face of said smaller base, and a hollow member having marginal contact with said smaller base on its other face and a securing means passing through said member and diaphragm to secure them to the plate.

3. An oscillatory device for reproducing instruments, comprising a thin, right, truncated cone having an integral smaller base, an armature having surface contact therewith on one face of said base, and a hollow member having edge contact on the other face of said base with the margin thereof and means to tightly secure said armature and member to said base.

4. An oscillating device for reproducing instruments, comprising a casing, a clamping ring fitting the edge of said casing and a truncated cone of thin sheet metal having a flat, outwardly turned flange clamped between said casing and ring, the internal diameter of said flange being less than the internal diameter of said casing and ring, thereby leaving an annulus of flat metal between said ring and casing base of the cone free to vibrate.

5. An oscillating device for reproducing instruments, comprising a cylindrical casing, a clamping ring fitting the edge of said casing and substantially of the same diameter, and a truncated right cone of thin metal having an outwardly turned flange at its lower base and perpendicular to the axis of the cone, the inner diameter of the flange being less than the inner diameter of the ring and casing, thereby leaving an annulus of flat metal between said ring and casing and base of the cone free of contact with other elements and free to vibrate.

6. An oscillating device for reproducing instruments, comprising a cylindrical casing, a clamping ring fitting the edge of said casing and substantially of the same diameter, and a truncated right cone of thin metal having an outwardly turned flange at its larger base, and perpendicular to the axis of the cone, the inner diameter of the flange being less than the inner diameter of the ring and casing, thereby leaving an annulus of flat metal between said ring and casing and base of the cone free of contact with other elements and free to vibrate, the smaller base of said cone being flat and integral therewith, a flat armature contacting with said smaller base and a hollow conical member having a cylindrical rim co-extensive with said smaller base and having edge contact thereon, and a clamping bolt passing through said member and smaller base and secured in said armature, to clamp said member and armature to opposite faces of said base.

In testimony whereof I have signed this specification.

GEORG SEIBT.